D. McD. CAMPBELL.

CAR-COUPLING.

No. 7,703.

Reissued May 29, 1877.

Attest:

S. Stodard.

G. B. Mann

Inventor:

Duncan McD. Campbell.

N. PETERS, PHOTO-LITHOGRAPHER, WASHINGTON, D. C.

UNITED STATES PATENT OFFICE.

DUNCAN McD. CAMPBELL, OF FLINT, MICHIGAN.

IMPROVEMENT IN CAR-COUPLINGS.

Specification forming part of Letters Patent No. 173,528, dated February 15, 1876; reissue No. 7,703, dated May 29, 1877; application filed June 19, 1876.

*To all whom it may concern:*

Be it known that I, DUNCAN McDOUGALD CAMPBELL, of the city of Flint, in the county of Genesee, State of Michigan, have invented certain new and useful Improvements on Car-Couplings; and I do hereby declare that the following is a full, clear, and exact description of the same.

My invention relates to an automatic railroad-car coupling, arranged to couple cars of different heights in a reliable manner; also to uncouple readily when any car is thrown off the track, so as to avoid danger of accidents.

The invention consists in a draw-bar, which extends in height to accommodate the difference in height of cars to any extent required, and a coupling link or hook, which is fastened in the draw-bar at a height above the rails equal to seven-eighths ($\frac{7}{8}$) the diameter of the wheel, which seven-eighths ($\frac{7}{8}$) is about twenty-nine (29) inches in the ordinary-sized wheel. This point I have discovered to be the true point for traction with the greatest advantage.

Figure 1:
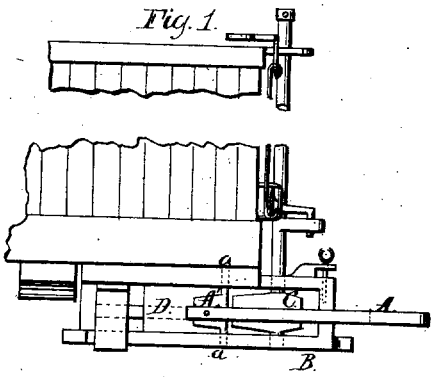
Figure 2:
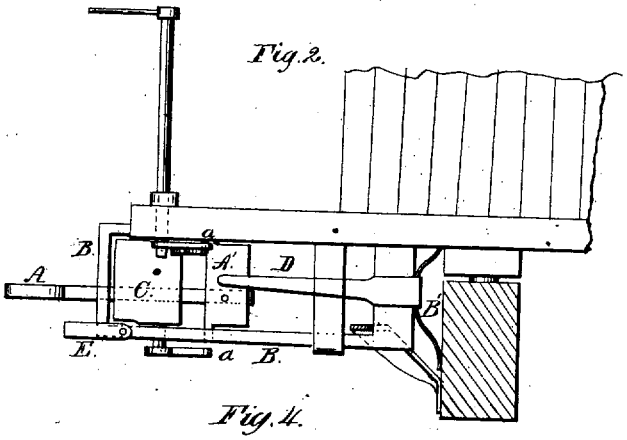
Figure 3:
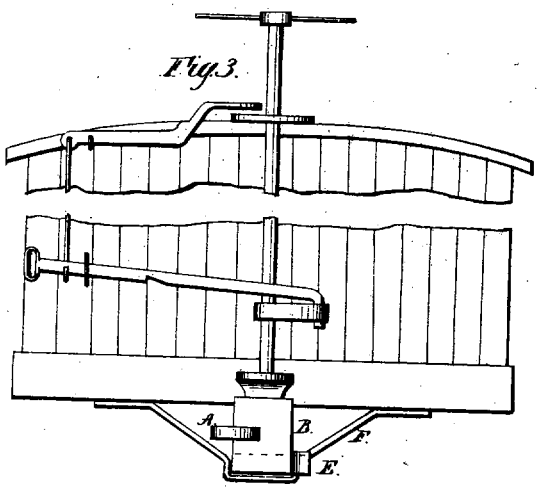
Figure 4:
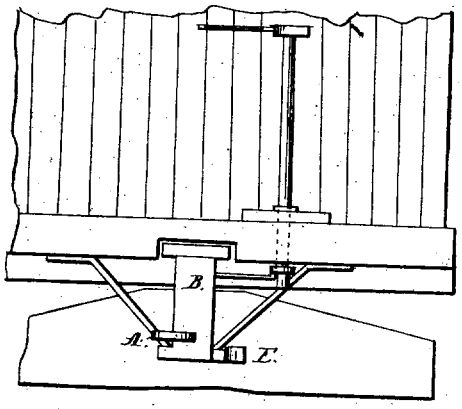
Figure 5:
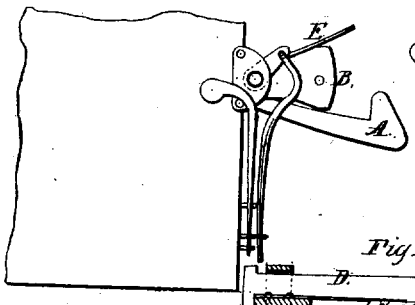
Figure 6:
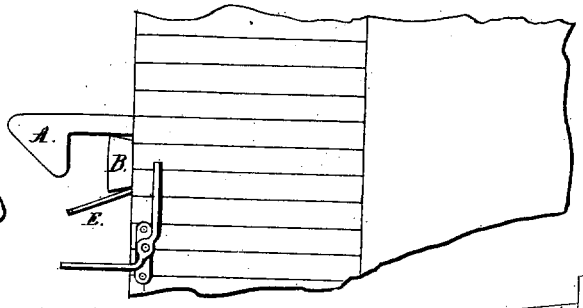
Figure 7:
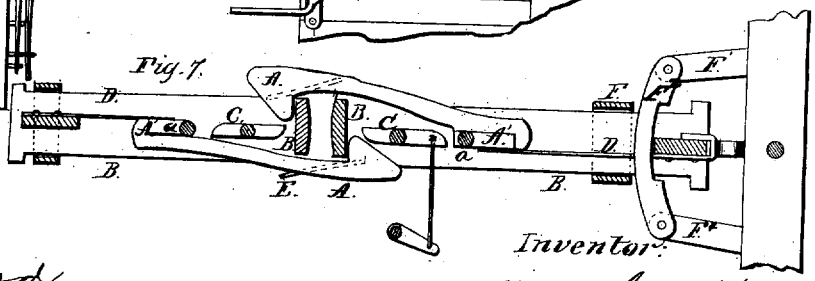

In the drawing hereunto annexed similar letters of reference indicate like parts, and Figures 1 and 2 are side elevations of ends of cars with my invention attached. Figs. 3 and 4 are end elevations of the Figs. 1 and 2. Figs. 5 and 6 are plans of Figs. 1 and 2. Fig. 7 is a sectional plan of my invention as attaching two cars together.

In the drawings, A represents the coupling link or hook, attached near its rear end by a vertical pivot-pin, *a*, to the draw-bar B, which is secured in a substantial manner to the bottom frame of the car, being of greater or less height, according to the height of the car above the track. The coupling-hook A is placed in the draw-bar B at a central height in the bar, and this height should be arranged to be at seven-eighths ($\frac{7}{8}$) of the diameter of the wheel of the car above the top of the rails, so that the strain of traction throughout the train may as nearly as possible be in one continuous line, equal in height above the rails, thereby reducing to the minimum the amount of tractive power lost by friction and indirect strains, &c.

Although I have described the proper point of traction as above set forth, yet I do not confine my invention to be used at that point, but where any particular construction of cars are in use or desired the height of which the line of traction is situated above the rails may be varied to accommodate the particular construction. When cars become of unequal height by one being loaded and the next empty or only partially loaded, and this difference is generally magnified by the relaxation of the springs and wear of the parts (irrespective of difference of load) in one car more than another, this difference in height is compensated for by the difference in height that the hook A in the one car will engage with the perpendicular front end of the draw-bar B in the next car, as is illustrated by the height of the hook A in Fig. 1 and that of A in Fig. 2.

The coupling-hook A is curved to pass sidewise of the buffer-shaped head or front part of the draw-bar to such distance beyond it that the hooked end of the link A may readily hook over the buffer-head of the adjoining car-coupling and leave the desired amount of "slack."

On the part A′ of the hook A, extending in rear of the pivot *a*, a bow-spring, D, is arranged to act. This bow-spring is attached to the vertical stiffening-bar of the draw-bar B, so that its end presses on the end A′ of the hook A, causing it (the hook) to interlock firmly in the adjacent draw-bar B of the next car, when brought to the position shown in Fig. 7; nevertheless yielding sufficiently to the vibrative and side swing of the cars when in motion. In front of the pivot *a*, and in the center, is pivoted a rotating plate, C, operated by suitable lever mechanism from the side, top, or platform of the car, according to the class of car my invention is applied to and what is most desired for the same.

It will be seen that the rotating plates C are each in a position between the coupling-hooks A, (shown in Fig. 7,) so that by turning either of them about a quarter of a revolution it acts upon both the couplings at the same time, (as will be clearly understood by the drawings,) detaching them simultaneously from the draw-bars B, and uncouples the cars.

The hooks A may be retained in the uncoupled position desired by a latch lever or equivalent mechanism, as shown in Fig. 3. This has to be released when the automatic coupling of the car is desired. Each draw-bar may, if desired, be provided with an outwardly-curved bar, E, on the buffer-head opposite to the hook A, to come in contact with the buffer-head of the next car, and prevent the side swing of the cars when in motion from uncoupling the hooks. The draw-bar may also be provided at the upper part with a perforated top lug or plate for coupling with cars having a common pin-and-link coupling. The number of apertures for bolt and link accommodation is not limited to the number shown in the drawings and just hereinabove referred to.

The rear end of the draw-bar is cushioned by suitable springs, B′, attached to the truck and bottom of the car, equalizing back pressure and saving the king-bolt by pressing against the beam of the truck and that of the cars. The draw-bar is also connected by a strong downward support, F, to the car.

To the beam of the truck is also attached a check, consisting of the braces $F^1$ and the arc-shaped piece $F^2$, for preventing the truck from turning beyond a certain distance, and saves the king-bolt by equalizing the forward pressure between the truck and car.

Having now fully described my invention, what I claim, and desire to secure by Letters Patent, is—

1. The check $F^1$ and $F^2$, as and for the purpose set forth.

2. The draw-bar B, in combination with the vertical spring B′, as and for the purpose described.

3. The draw-bar B having guard E, in combination with check $F^1$ and $F^2$, as and for the purpose shown and described.

4. The hook A, pivoted on swinging plate A′, draw-bar B, bow-spring D, and check $F^1$ and $F^2$, combined, arranged, and operated, as shown and described, and for the purpose specified.

DUNCAN McDOUGALD CAMPBELL.

Witnesses:
DWIGHT B. STONE,
DAMON STEWART.